United States Patent [19]

Antoine

[11] Patent Number: 4,473,238
[45] Date of Patent: Sep. 25, 1984

[54] WHEEL SUSPENSION FOR VEHICLES
[75] Inventor: Aubry J. Antoine, Cabries, France
[73] Assignee: Societe Nationale Industrielle et Aerospatiale, Paris, France
[21] Appl. No.: 456,535
[22] Filed: Jan. 7, 1983
[30] Foreign Application Priority Data Jan. 28, 1982 [FR] France ............................ 82 01344

[51] Int. Cl.³ .......................................... B60G 11/18
[52] U.S. Cl. ................................. 280/723; 267/149; 280/721
[58] Field of Search ............. 280/721, 689, 700, 717, 280/723; 267/148, 149, 57

[56] References Cited

U.S. PATENT DOCUMENTS

| | | | |
|---|---|---|---|
| 2,426,513 | 8/1947 | Linn | 280/723 |
| 3,856,289 | 12/1974 | Steele | 267/149 |
| 4,168,075 | 9/1979 | Matschinsky | 280/689 |
| 4,291,895 | 9/1981 | Wohrle et al. | 280/723 |

Primary Examiner—Richard A. Bertsch
Attorney, Agent, or Firm—Marshall, O'Toole, Gerstein, Murray & Bicknell

[57] ABSTRACT

A suspension for a set of two wheels of a vehicle comprises two arms oscillating about an axis X—X transverse with respect to the vehicle and each bearing a wheel, and dampers associated with said arms to counteract and damp the vertical movements of the wheels. The dampers comprise an assembly of two concentric tubes made of composite fiber-synthetic resin material coaxial to the transverse axis X—X of oscillation of the arms. The ends of the tubes are connected to each other and with one of the arms, and the outer tube of the assembly of tubes is connected to the chassis of the vehicle at at least one point close to the middle of its length.

5 Claims, 4 Drawing Figures

WHEEL SUSPENSION FOR VEHICLES

The present invention relates to a suspension for a set of two wheels of a vehicle, comprising two arms oscillating about an axis transverse with respect to said vehicle and each bearing one of said wheels, elastic means and damping means being associated with said arms respectively for counteracting and damping the vertical movements of said wheels. The suspension according to the invention is more particularly, although not exclusively, adapted to be used as rear suspension of an automobile vehicle of the front-wheel drive type.

According to the invention, the suspension is noteworthy in that said elastic means comprise an assembly of two concentric tubes made of composite fibre-synthetic resin material, coaxial to said transverse axis of oscillation of the arms and connected at each of their ends to each other and one of said arms and in that the outer tube of said assembly of tubes is connected to the chassis of the vehicle at at least one point close to the middle of its length.

Each half of the outer tube of said assembly of tubes thus acts as a torsion bar for the arm to which it is connected, while the inner tube of said assembly acts as anti-roll coupling means between said arms. The fact of making said tubes of composite fibre-synthetic resin material makes it possible to obtain therefor mechanical characteristics corresponding to the functions that they fulfill and which would be impossible to obtain with steel tubes, of comparable dimensions and weight. Due to the present invention, a suspension may therefore be produced which, while being simple, is light, thus reducing the total weight of the vehicle and consequently leading to a reduction in fuel consumption.

Each arm is preferably in the form of a bent lever pivoted on said chassis at its bend, one of the branches of the arm bearing a wheel at its end, whilst the other of said branches is connected to the chassis of the vehicle via a damper. The branch bearing the wheel may be disposed towards the rear of the vehicle with respect to the axis of oscillation of the arm, so that the corresponding wheel is drawn during advance of the vehicle.

In an advantageous embodiment, each arm comprises a hollow transverse sleeve of which the outer wall pivots with respect to the chassis of the vehicle via two bearings spaced along said transverse oscillation axis of the arms and which is traversed by one of the ends of said assembly of tubes, each of the ends of said assembly of tubes being rendered fast with the inner wall of said sleeve.

The ends of the assembly of tubes and the inner wall of the sleeve may be connected by friction. To this end, a radially expansible ring may be mounted between the end of said assembly of tubes and the inner wall of said sleeve and means for axially compressing said ring may be provided thereon.

In order to adjust the stability of the vehicle, means for connecting the outer tube of said assembly of tubes to the chassis of the vehicle are provided such that they enable the angular orientation of said assembly of tubes about its own axis to be adjusted.

The present invention also relates to a system of elastic return and of anti-roll coupling of the two wheels of a set of wheels of a vehicle equipped with a suspension comprising two arms oscillating about an axis transverse with respect to said vehicle and each bearing one of said wheels, such system being noteworthy in that it comprises an assembly of two concentric tubes of composite fibre-synthetic resin material which are fast with each other at each of their ends.

The invention will be more readily understood on reading the following description with reference to the accompanying drawings, in which:

FIG. 4 illustrates the process of correction of stability.

In these Figures, like references denote like elements.

Figure 1:
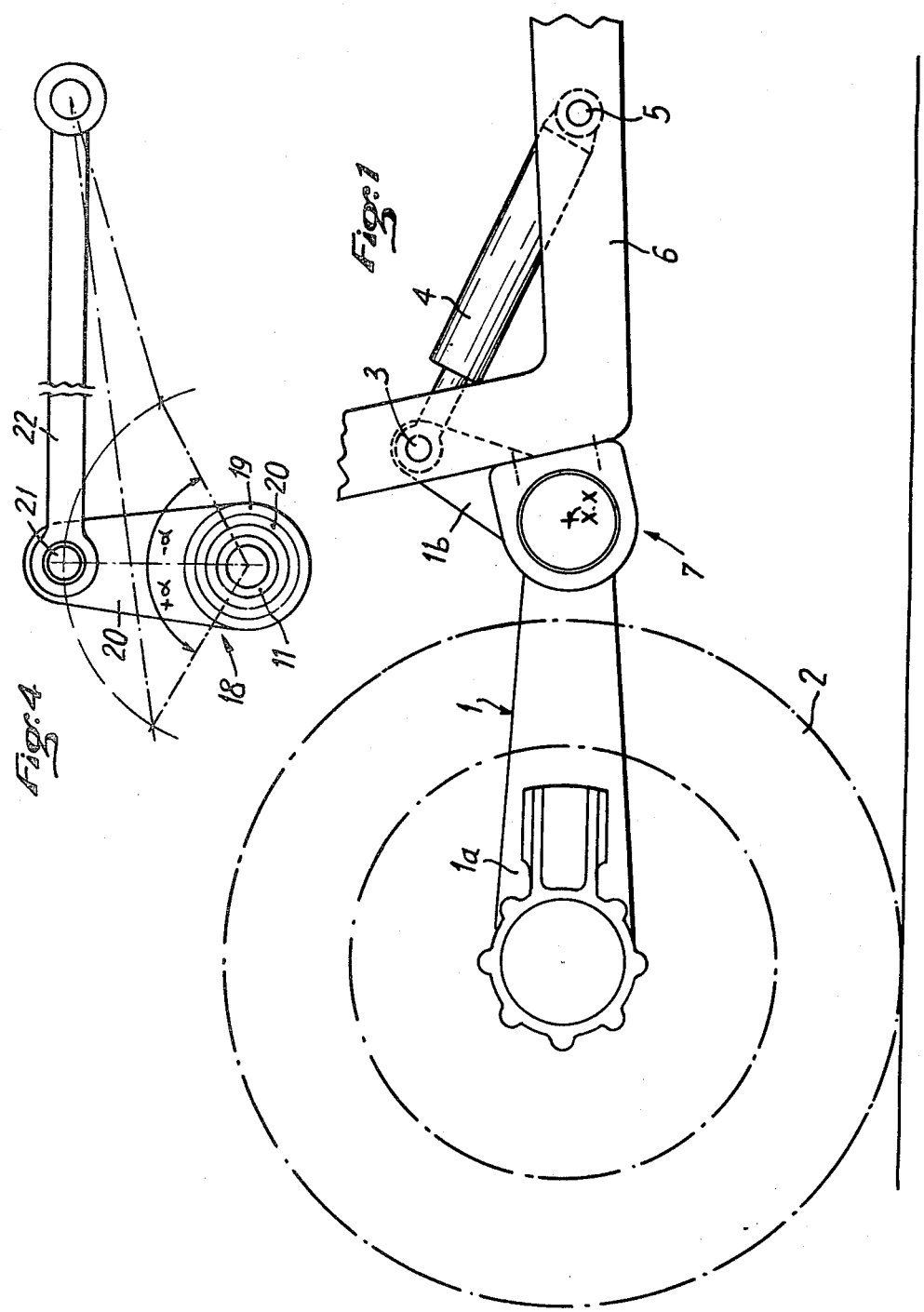
FIG. 1 is a schematic view in elevation of a suspension of the type according to the invention.

Referring now to the drawings, the rear suspension for front-wheel drive vehicle, shown in FIG. 1, is of the type with drawn wheel and comprises bent suspension arms 1. One branch 1a of each arm 1 bears a wheel 2 at its end, while the other branch 1b of said arms is articulated at 3 on one end of a telescopic hydraulic damper 4. The other end of the damper 4 is articulated at 5 on the chassis 6 of the vehicle (not shown). Moreover, at the bend connecting branch 1a to branch 1b, each arm 1 is articulated on chassis 6 via an arrangement 7 allowing said arm to move about an axis X—X transverse with respect to the vehicle.

Figure 2:
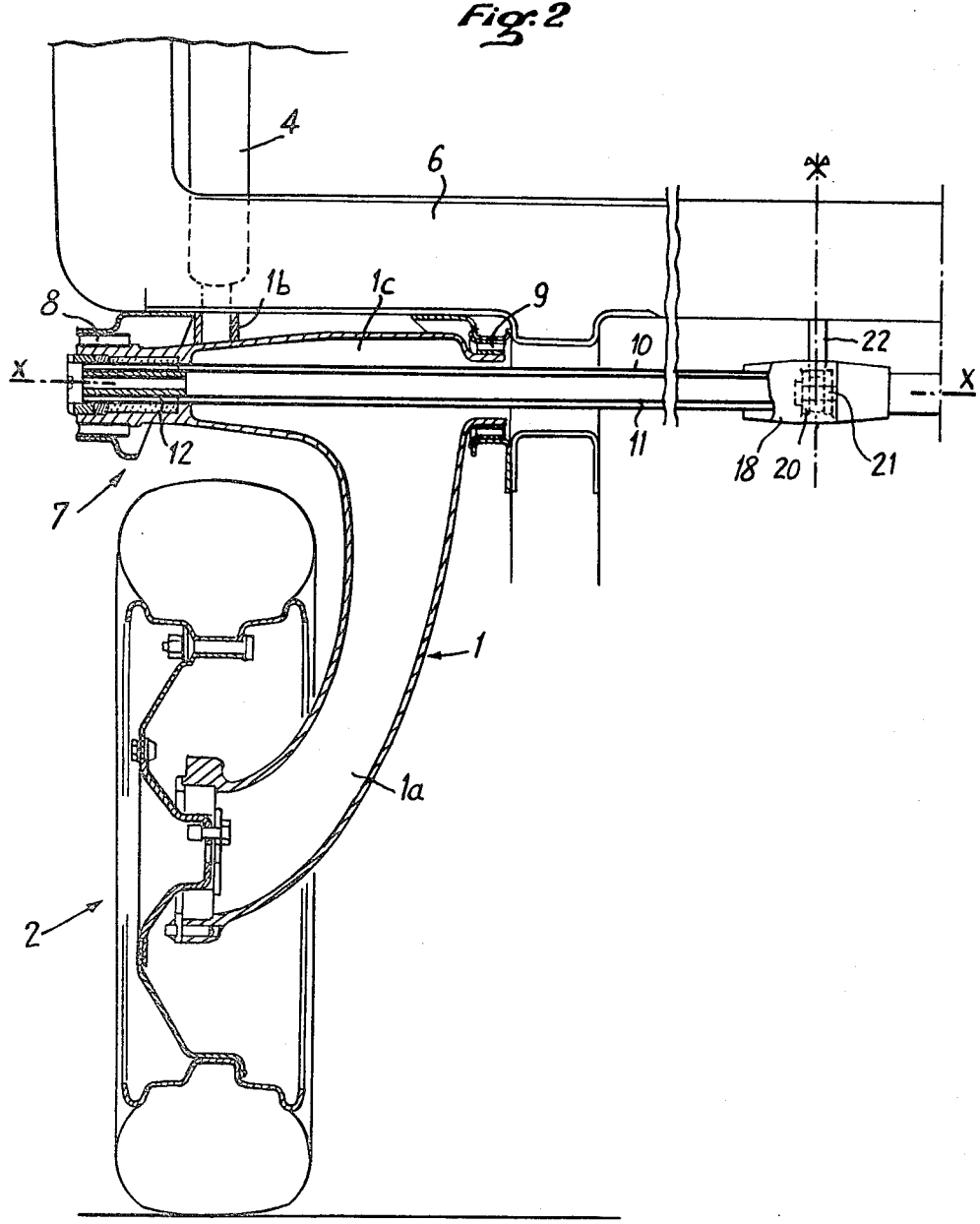
FIG. 2 shows, in plan view with respect to FIG. 1, the left half of a suspension according to the invention, with partial section, the right half of the suspension being identical and symmetrical to the left half.
Figure 3:
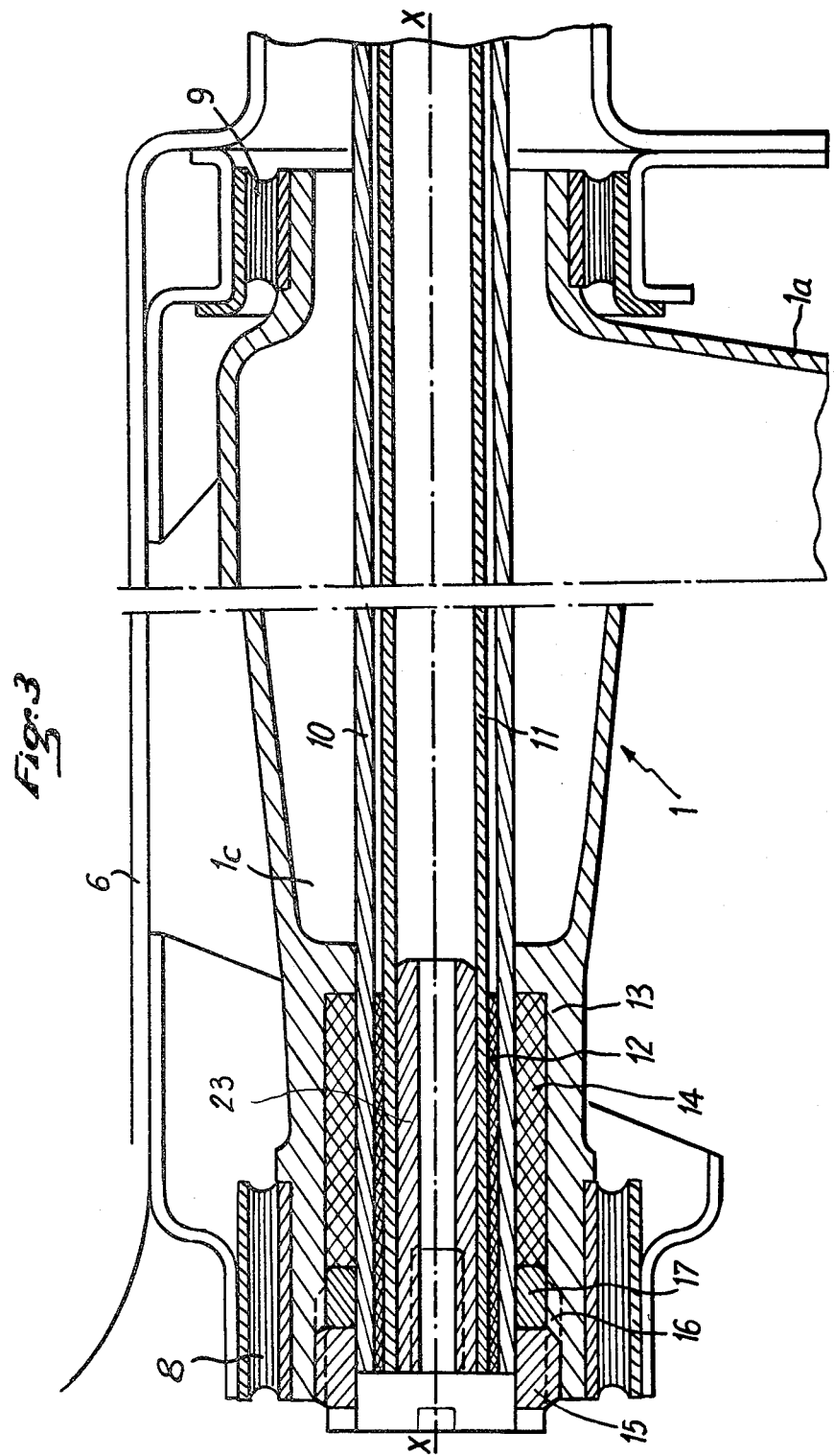
FIG. 3 shows to a larger scale the assembly of the suspension arms on the chassis of the automobile vehicle according to the present invention.

As shown in FIGS. 2 and 3, the arms 1 are hollow and comprise an elongated sleeve 1c of axis X—X, i.e. transverse with respect to branches 1a and 1b.

At the two ends of the sleeve 1c are arranged bearings 8 and 9, respectively, connecting said arms 1 to the chassis 6. The bearings 8 and 9, whose axis merges with the axis X—X are preferably of the laminated type and therefore will allow rotation of the arms 1 about said axis X—X.

The two arms 1 of the suspension of a set of two wheels 2 are connected to each other by an assembly of two tubes 10 and 11, concentric with respect to each other and centred on the axis X—X. The two tubes 10 and 11 are made of a composite material constituted by fibres (glass, carbon, boron, etc ... or a mixture of these materials) coated with a synthetic resin, by carrying out any known process (coiling of filaments, superposition of braids, weaving, etc ...) making it possible to obtain for said tubes high values of the ratio R/E, in which R is the breaking stress and E the modulus of elasticity.

Tubes 10 and 11 are secured to each other at their two ends, for example by adhesion with interposition of an intermediate ring 12.

The joined ends of tubes 10 and 11 thus reinforced by ring 12 pass through the sleeves 1c of the two coupled arms 1 and are housed in a housing 13 in said sleeves provided on the outer bearing 8 side and are secured to the corresponding arm 1 by friction. To this end, in each housing 13 there is provided an elastic bush 14, for example made of an elastomer such as a polyurethane surrounding the outer end of the tube 10, while a compression nut 15 is provided, adapted to screw in a thread 16 on the wall of the housing 13. Inside the tube 11 is disposed a rigid metal bush 23 fitted tightly inside the tube and whose length is slightly greater than that of the elastic bush 14. Thus, by screwing the nut 15, the bush 14 may be compressed, possibly via a sliding ring 17, so that said bush 14 expands radially. The static pressure thus created between the bush 14 and the inner wall of the housing 13, between the bush 14 and the tube 10, between the tube 10 and tube 11 through ring 12 and, finally, between tube 11 and the rigid bush 23, joins the assembly of tubes 10 and 11 and the two suspension arms 1 by friction.

Moreover, the outer tube 10 is anchored at its centre to the chassis 6, for example via a stability corrector device 18. This device 18 may comprise a bush 19 adhered to the outer wall of the tube 10 and fast with a strap 20 articulated at 21 on a connecting rod 22.

The outer tube 10 thus forms a torsion tube connecting the two suspension arms 1 and variably fixed at its centre on chassis 6. Further to this median anchorage, each half of the torsion tube 10 comprised between device 18 and one end acts as a torsion bar independent of the other. Of course, any torsion of one of said halves of the tube 10 is transmitted to the corresponding end of the inner tube 11 which transfers it to its other end. This inner tube 11 therefore acts as anti-roll coupling device of the two arms 1 of the suspension.

It will be readily understood that by controlling the rod 22 (due to means not shown), the bush 19 may be made to rotate about axis X—X and therefore communicate a rotation about said axis to the assembly of tubes 10-11, enabling the angular orientation of the arms 1 about axis X—X and therefore the stability of the vehicle to be adjusted.

What is claimed is:

1. In a suspension for two wheels of a vehicle, a pair of arms mounted on said vehicle for rotation about a transverse axis relative to said vehicle, each arm carrying one of said wheels, an assembly comprising inner and outer concentric tubes formed of composite fiber-synthetic resin material, said tubes being coaxial with said transverse axis, said tubes being effectively connected at each of their ends to each other and to one of said arms, the outer tube of said assembly being connected to said vehicle at at least one point intermediate its ends.

2. A suspension in accordance with claim 1, wherein each arm comprises a hollow sleeve section substantially coaxial with said transverse axis and having inner and outer walls, said sleeve being mounted for rotation about said transverse axis by a pair of spaced bearings in contact with the outer wall of said sleeve section, each end of said assembly of tubes passing coaxially through one of said sleeve sections and being effectively connected to the inner wall thereof.

3. A suspension in accordance with claim 2, wherein the ends of said tube assembly and the respective inner walls of said sleeve sections are interconnected by frictional means.

4. A suspension in accordance with claim 3, wherein said frictional means comprises a radially expansible friction ring disposed between the outer tube of said tube assembly and the inner wall of said sleeve section, and means mounted on said sleeve section for axially compressing said ring.

5. A suspension in accordance with claim 1, wherein said outer tube is connected to said vehicle by means which is controllable to adjust the angular orientation of said tube assembly about said transverse axis.

* * * * *

UNITED STATES PATENT AND TRADEMARK OFFICE
CERTIFICATE OF CORRECTION

PATENT NO. : 4,473,238

DATED : September 25, 1984

INVENTOR(S) : Jacques Antoine AUBRY

It is certified that error appears in the above-identified patent and that said Letters Patent is hereby corrected as shown below:

Cover page, line 2 [75], the inventor's name should be --Jacques A. Aubry--.

Signed and Sealed this

Twelfth Day of March 1985

[SEAL]

Attest:

DONALD J. QUIGG

*Attesting Officer*     *Acting Commissioner of Patents and Trademarks*